United States Patent [19]

Schindele

[11] Patent Number: 4,720,768
[45] Date of Patent: Jan. 19, 1988

[54] ELECTRICAL MEDICAL RAIL SYSTEM

[76] Inventor: Ernst Schindele, 505 W. Hill Rd., Stamford, Conn. 06905

[21] Appl. No.: 938,561

[22] Filed: Dec. 5, 1986

[51] Int. Cl.$^4$ ............................................. H02B 1/04
[52] U.S. Cl. .................................... 361/334; 174/101; 361/428
[58] Field of Search ...................... 174/48, 49, 97, 101; 361/331, 332, 334, 346, 347, 348, 350, 355, 358–360, 378, 428; 339/21 R, 22 R, 23; 200/296

[56] References Cited

U.S. PATENT DOCUMENTS

| | | | |
|---|---|---|---|
| 3,377,756 | 4/1968 | Polhamus | 174/101 |
| 3,451,738 | 6/1969 | Hobson | 312/209 |
| 3,721,762 | 3/1973 | Gooding | 174/97 |
| 3,821,688 | 6/1974 | Larsile | 174/97 |
| 4,166,195 | 8/1979 | Schwab | 174/101 |
| 4,305,430 | 12/1981 | Svensson | 138/115 |
| 4,338,485 | 7/1982 | Fullenkamp et al. | 174/48 |
| 4,544,214 | 10/1985 | Nizel et al. | 312/209 |
| 4,586,759 | 5/1986 | Wrobel | 312/198 |
| 4,646,211 | 2/1987 | Gallant et al. | 362/149 |

Primary Examiner—G. P. Tolin
Attorney, Agent, or Firm—Parmelee, Bollinger & Bramblett

[57] ABSTRACT

An electrical medical rail system having a hollow rail which may be subdivided in two or more longitudinal conduits for housing the leads of an electrical supply provides a flexible, high and/or low voltage electrical service for medical applications. The hollow rail has aligned outer grooves extending longitudinally along the top and bottom edges for detachably mounting medical equipment and lighting on the rail. A two component longitudinal housing in which one of the components is a snap-in panel and the other an integrated part of the rail provides a high voltage housing which provide electrical outlets, lighting switches and other high voltage equipment. The electrical components may be detachably mounted on the panel and the rail arrangement quickly altered by changing panels on the high voltage housing. A low voltage housing in the form of a two component system with one of the components being a snap-in panel may include low voltage apparatus such as intercom systems, warning lights and other low voltage apparatus which housing is mounted in abutting contiguous fashion on the power rail. The system has great flexibility in location and provides multiple, random access to high and low voltage supplies while rending new construction and renovation of critical care and patient areas, simple, easy to solve and considerably less expensive than other forms of electrical wiring.

6 Claims, 8 Drawing Figures

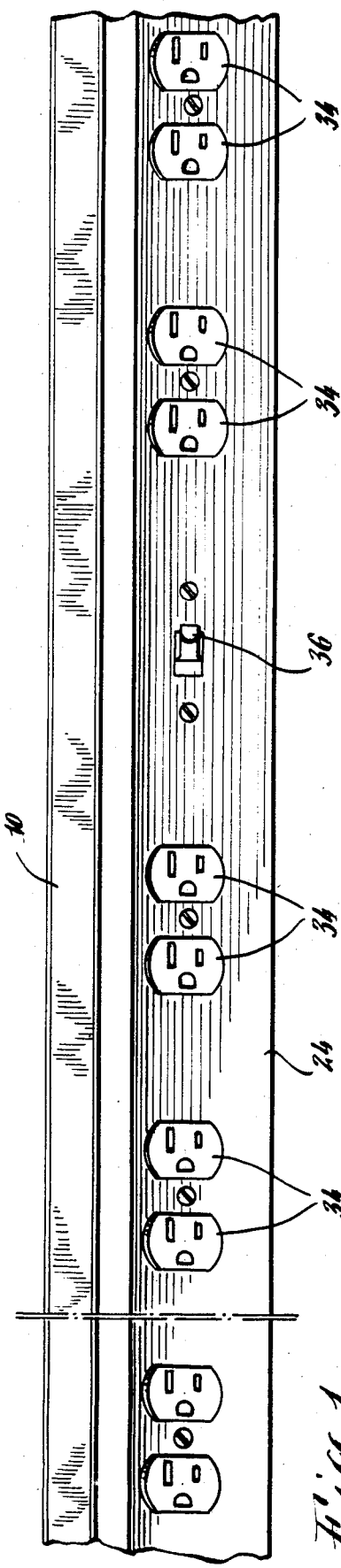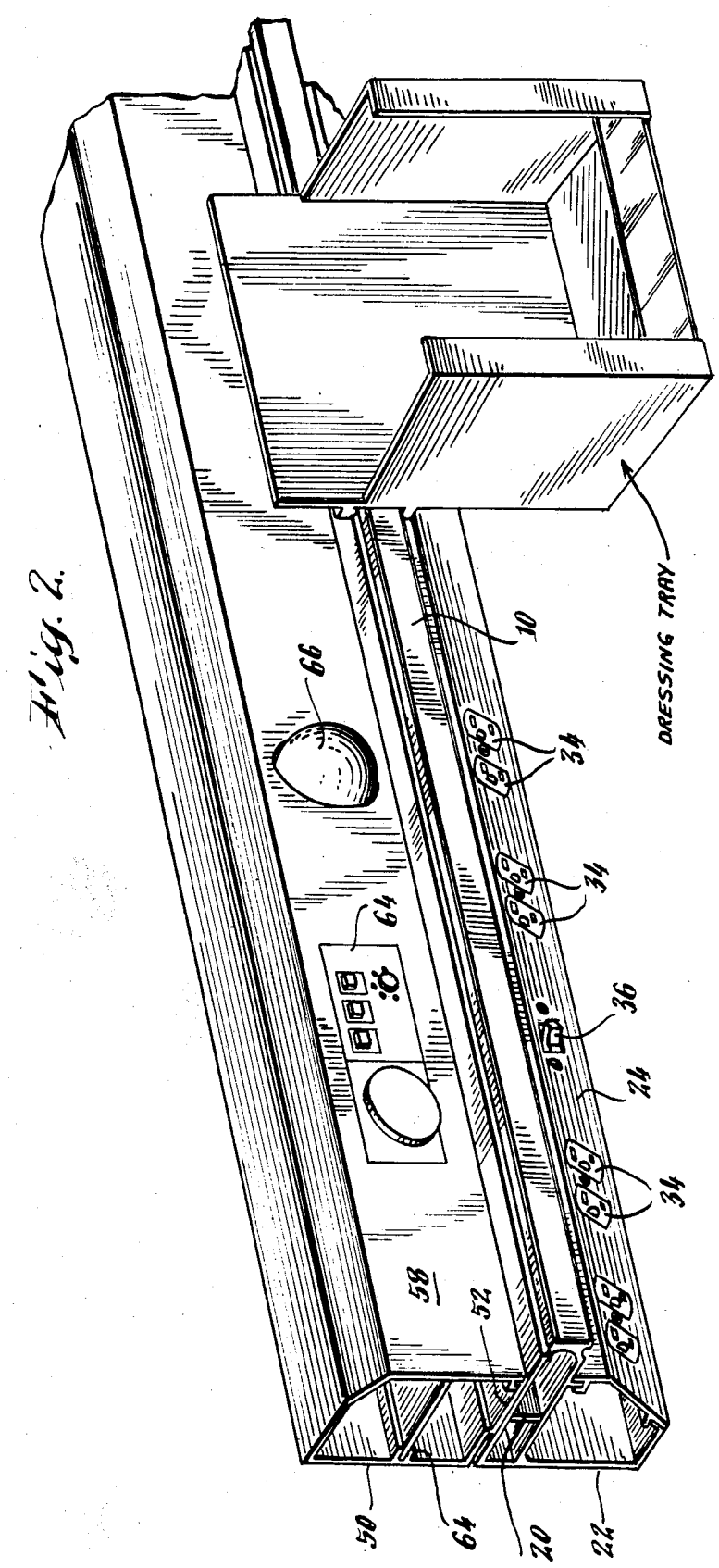

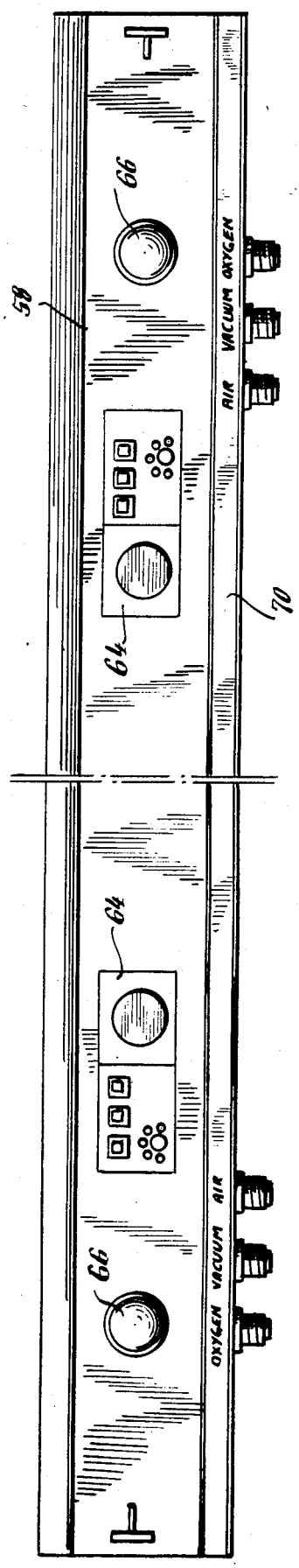
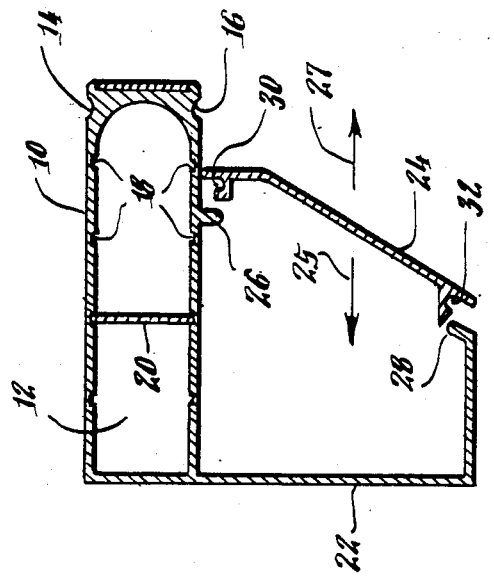
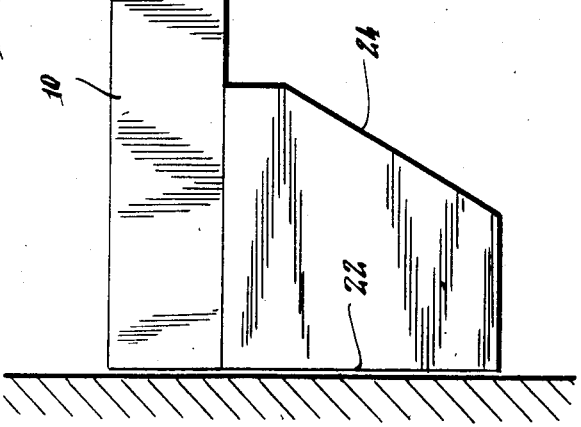

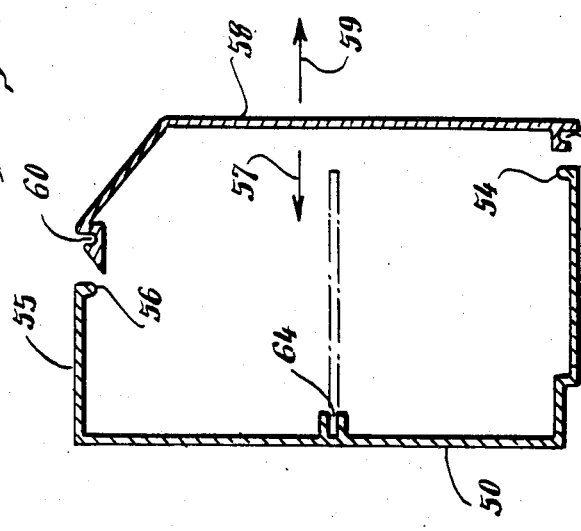
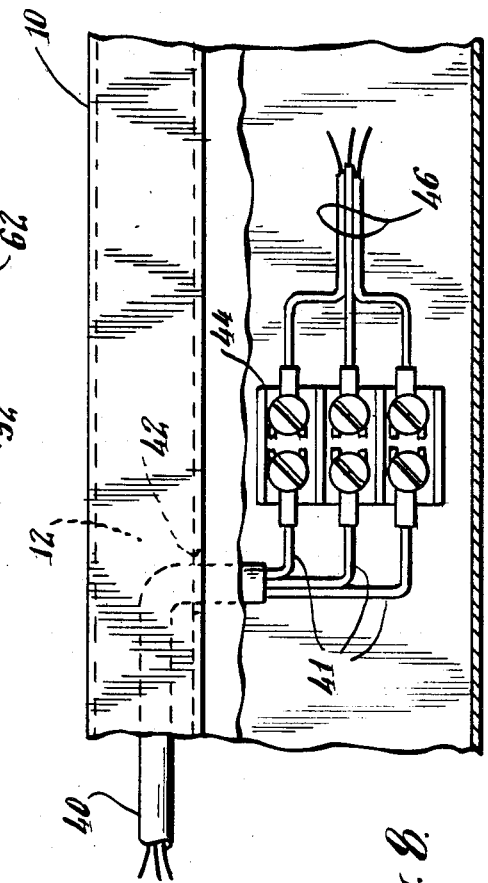
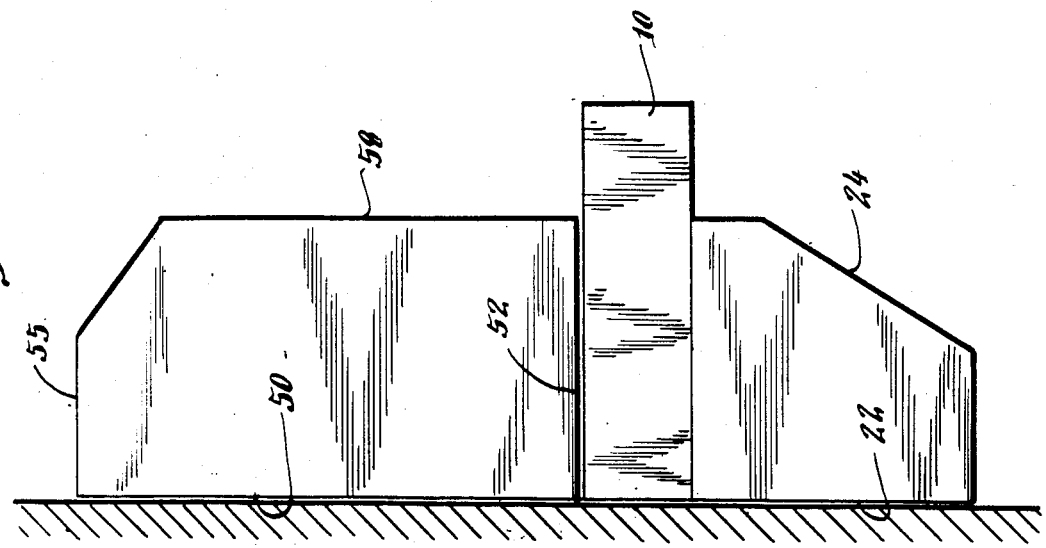

ELECTRICAL MEDICAL RAIL SYSTEM

BACKGROUND OF THE INVENTION

This invention relates to an electrical power rail system, and more particularly to such a system with a subdividable hollow rail for providing individual conduits for separate electrical power supplies which rail also functions for detachably mounting electrical equipment thereon and which rail is combined with snap-in panels which may be utilized to form separate high and low voltage housings for separating high and low voltage equipment which are utilized in medical applications.

Medical facilities, whether employed for emergency room or up-to-date operating room services or simple hospital rooms or other patient-care type centers normally require a large variety of electrical power outlets having different voltage requirements. The variety and number of different pieces of equipment which must be accommodated must provide therefore, a very flexible electrical power service to the facility where such equipment is to be used. Thus, whether the equipment be up-to-date monitoring electrocardiagram equipment or simple intercom or signalling systems, the various rooms must be equipped to handle the variety of equipment required. One of the major difficulties in providing electrical service to any particular room or medical facility is the end of flexibility of the system once it is installed. The ever changing nature of medical equipment and services may at times require modification of the installations to rearrange or accommodate new or supplemental types of equipment or service. Accordingly, if the facilities are not properly wired and planned, the outlets for furnishing electrical power supplies may not be properly placed thereby requiring substantial constructural change and rewiring. Accordingly, once a facility is planned, it is expensive and time consuming to change the wiring to accommodate rearrangement or changes in the medical facility. This is, of course, characterized in all permanent type installations. There are also special rules for wiring and providing electrical supplies in hospitals and various other medical facilities which require separation of the high and low voltage supplies as well as providing multiple supplies when large amounts of outlets and equipment so require. Accordingly, providing a sufficient number of electrical outlets, providing both low and high voltage supplies as well as intercom systems which are permanently installed and spaced around a particular room may not only provide an unnecessary expense, but in addition will provide no assurance that the outlets so supplied will be placed in the most convenient location to accommodate changes in the use and the arrangement of the equipment in the room. In other words, any such permanent arrangements for supplying electrical supplies to a given area is inflexible.

SUMMARY

Accordingly, it is an object of this invention to provide a new and improved electrical rail system for medical applications which allows total flexibility and equipment location.

Another object of this invention is to provide a new and improved electrical rail system for medical applications which is readily removable and may be quickly and easily moved and installed and serviced permitting the total rearrangement of the power delivery system in a particular room or location.

Another object of this invention is to provide a new and improved electrical rail system for accommodating both high and/or low voltage service and/or a multiplicity of electrical service through a common system.

Another object of this invention is to provide a new and improved electrical rail system which is suitable for new construction or renovation of critical care areas and patient rooms in a simple and cost efficient manner.

Still a further object of this invention is to provide a new and improved electrical rail system which performs a dual function of not only providing a convenient means for an electrical distribution system but also provides a mounting structure for securing medical and storing electrical equipment which is used with the energy sources supplied by the rail system.

In carrying out this invention in one illustrative embodiment thereof, an electrical rail system is provided with high and/or low electrical/voltage service for medical application. A hollow rail which is capable of being subdivided into two or more longitudinal conduits is provided for housing the leads of an electrical supply with each of the longitudinal conduits housing the leads of a separate source. The rail is equipped with aligned outer grooves extending longitudinally along the top and bottom edges of the rail which are adapted to detachably mount electrical medical equipment and lighting in the outer grooves on the rail. In addition, at least one two component longitudinal housing in which one component is in the form of a snap-in panel is provided which is mounted contiguous to and abutting the rail and is adapted to have electrical service from leads in the conduits extending therein and being connected to utilization devices in the longitudinal housing.

Conveniently, the snap-in panels may have outlets and various other electrical components such as switches, lamps, or intercoms mounted therein which may be attachably wired in the other part of the housing whereby the panels may simply be removed and positioned in various locations to quickly modify and change the positions of the outlets and components on the electrical supplies of a given rail configuration. In addition, the rails themselves can be quickly dismounted and moved providing total flexibility in providing electrical supplies in a medical facility.

BRIEF DESCRIPTION OF THE DRAWINGS

The invention, together with further aspects, objects, features and advantages thereof will be more clearly understood from the following description taken in conjunction with the accompanying drawings in which like elements bear the same reference numerals throughout the various views.

FIG. 1 is a front elevational view of the power rail system of the present invention having a high voltage housing attached thereto.

FIG. 2 is a perspective view of the power rail system illustrated in FIG. 1 having a low voltage housing mounted above the power rail and illustrating a dressing tray on the rail.

FIG. 3 is a front elevational view of a gas rail system in combination with the low voltage housing in accordance with the present invention.

FIG. 4 a diagrammatic illustration of a side elevational view of a rail system incorporating the high voltage supply of the type illustrated for example, in FIG. 1.

FIG. 5 is a diagrammatic illustration in side elevation of the rail system illustrated in FIG. 2.

FIG. 6 is a cross-sectional side elevational view illustrating the power rail system of the present invention incorporating a high voltage housing with a snap-in front panel.

FIG. 7 is a cross-sectional view in side elevation of a low voltage housing with a snap-in front panel which is adapted to be mounted on contiguous with the rail systems illustrated in FIGS. 2 and 3, for example.

FIG. 8 is a partial front view of the high voltage rail system with the front panel removed illustrating a terminal connection from a voltage source housed in the hollow rail to which electrical elements mounted on the front panels are adapted to be connected.

DESCRIPTION OF THE PREFERRED EMBODIMENTS

Referring now to FIGS. 1, 4 and 6, a first type of rail system is shown in accordance with the present invention which includes a hollow rail 10 having a channel 12 running longitudinally therethrough as is best shown in FIG. 6. The rail 10 has aligned upper-outer groove 14 and lower-outer groove 16 which are used for clamping and mounting medical appliances upon the rail. For example, FIG. 2 illustrates a dressing tray detachably positioned in grooves 14 and 16 on rail 10. The hollow channel 12 will act as a conduit for electrical leads which supply a source of power for the rail system. The channel 12 has a plurality of aligned upper and lower grooves 18 therein which are adapted to accommodate a longitudinal partition 20 therein which in the case of a single partition would divide the channel 12 into two conduits while two partitions 20 would divide the channel 12 into three conduits and so on. In medical applications separate lines are required for a variety of applications, and the separate power sources must be separated which is conveniently accomplished by the hollow rail 10 which is adapted to be partitioned off or subdivided into a plurality of conduits.

As will be seen in FIG. 6, the rail 10 is configured to form a two piece housing 22 and 24 with the housing element 22 being formed integrally with the rail 10. The rail 10 has a downwardly extending ridge 26 and the housing element 22 has an upwardly extending ridge 28 which cooperates with an upper longitudinal groove 30 and a lower downwardly facing groove 32 respectively, which are formed on the housing component 24 thereby forming a snap-in panel 24. The upper groove 30 is conveniently placed over the longitudinal ridge 26 and the lower groove 32 of the front panel 24 is snapped into engagement with the upstanding ridge 28 on the housing component 22 in the direction of arrow 25 and removed in the direction indicated by arrow 27. Returning to FIG. 1, the snap-in panel 24 has mounted therein a plurality of female receptacles 34 and an on/off switch 36. It will be understood that the snap-in panels 24 may include any number or types of receptacles and switches required for a particular application in accordance with the desires of the user, or the front panel 24 may have no components thereon and may be used to simply cover and enclose the other housing component 22. The snap-in panels may come in a variety of lengths, for example, 24, 30 or 48 inches long while the rail 10 including the integral housing component 22 may come in lengths of 8, 10 or 12 feet which are standard lengths and can be provided with incremental sections as required. As was pointed out, the electrical components in the form of the receptacles 34 and the switch 36 are premounted to individual snap-in panels 24 and are connected to terminals which are mounted on the housing component 22, for example, as illustrated in FIG. 8. In FIG. 8 electrical wire lead 40 which for example, may carry 110 or 220 volts, is a three wire conductor having a grounding lead which runs through the channel 12 in the hollow rail 10 and extends through an opening 42 in the lower wall of the rail 10 to a terminal block 44 to which the three wire leads 41 of the source 40 are connected. In turn, three wires are connected to the other side of the terminal, these three wires being designated 46 which are connected to the electrical components 34 and 36 in the snap-in panel 24. Thus, simply by disconnecting the wires 46 which are coupled to the snap-in panel 24, the particular panel may be removed and a different panel substituted, which if it does contain electrical components, may be connected to the terminal block 44 which is being supplied with power from the cable 40 running through the channel 12 of the hollow rail 10.

With the provision of the partitions 20, separate supply cables 40 can be directed through the different channels which have been compartmentized or divided by the separators 20 to provide different sources of power at different points along the rail. All that is necessary would be to tap a point in the rail and run the cable to another terminal block 44 to which connections can be made to a front panel which has been snapped in the rail. The housing component 22 of the rail 10 may be installed on a wall by spot drilling holes therein and secured to the wall by self-tapping screws. In heavy load situations a screw may be mounted by drilling a hole between the grooves 14 and 16 to allow clearance for a screw head and the drilling of a hole in the back of the rail through the channel 12 and mounting a screw in the wall at that point.

With the snap-in panel configuration which permits varying the type of components which will be mounted in any given panel, and the easy disconnect to terminals, for example, as illustrated in FIG. 8 in the form of terminal 44, the panels may be readily changed and the entire rail may be mounted and dismounted from the wall in easy fashion providing a flexible means of changing an entire electrical configuration in a room without rearranging or rewiring the entire room.

FIGS. 2, 5 and 7 illustrate another rail system configuration which incorporates into the previously described system a low voltage raceway in the form of a two component system as will best be seen in FIG. 7. A wall housing member 50 having a base 52 with an upstanding ridge projection 54 thereon and a top 55 with a downwardly extending ridge 56 thereon is adapted to be closed by a snap-in panel 58 having an upper groove 60 therein adapted to engage the downwardly extending ridge 56 and a bottom groove socket 62 which is adapted to engage the upstanding longitudinal ridge 54 in the base 52. The panel 58 will snap in and close the housing element 50 in the direction of arrow 57 and can be removed in the direction of arrow 59. An intermediate slot in the housing 64 is adapted to provide a means for holding a partition therein to divide the housing 50 into more than one conduit. This is in case separate low voltage lines are required. The wall housing member 50 is adapted to be mounted on a wall with the base 52 resting on and being contiguous with the upper surface of the rail 10 as is diagrammatically illustrated in FIG. 5 and is shown in actual appearance in the rail system of FIG. 2 which also shows a high voltage panel 24 mounted on the rail 10. As will best be seen in FIG. 2, the low voltage panel 58 may have mounted thereon such low voltage electrical components as an inter-com system or paging system 64, warning or signal lights 66 and other similar low voltage electrical components. As described in connection with FIG. 1, with respect to the high voltage panels, the low voltage housing members 50 will be made up of extrusions available in standard 8, 10 and 12 foot lengths with incremental sections as required and the front snap-in low voltage panels 58 being available in lengths of 20, 24 and 30 inches and which can be relocated along the low voltage raceway. The panels 58 may be built to customer specifications and may include patient call systems, patient monitor outlets, TV and telephone connectors or other low voltage components. Such components may be wired in a manner similar to FIG. 8 with the low voltage source running to terminals 44 on wall 50. As in the high voltage application, the low voltage panels 58 may be connected and disconnected with wiring to terminals 44. The housing element 50 may be screw mounted on the wall 25 with the bottom 52 of the housing element 50 being abutting and contiguous with the top of the rail 10. The low voltage raceway 50 with its snap-in panel 58 may be also mounted on a medical gas rail system 70 of the type shown and described in U.S. Pat. No. 4,498,693 illustrated in FIG. 3. The purpose of this showing is to illustrate the flexibility of the rail system in accordance with the present invention.

The application capabilities of the rail systems described encompass many and a variety of medical applications including the entire hospital patient treatment environment from regular patient rooms to the most sophisticated critical care units, operating rooms, diagnostic or laboratory facilities. The building block system employed by the present invention allows headwall rail design combinations which provide total flexibility in designing as well as rearranging and changing on short notice with minimal expense the entire arrangement of electrical power supplied and units to a medical facility including the actual detachably mounted of medical apparatus on the rail itself which is in turn furnishing the power or the various fluids required in patient care rooms. The two component aspect of the rail housings and raceways for providing power can be made from extrusions which provide facility in length and by providing the snap-in panels, change may readily be made in the positioning of the electrical components along the rail, if it is unnecessary to move the rail itself. The electrical systems which are to be incorporated and housed in the various rail configurations all comply with medical standards for supplying separate power sources with separate input lines which may be provided with circuit breakers, power receptacles, ground jacks, grounding bus bars, transformers and isolation line monitors as well as accessory equipment such as nurse call systems, monitor outlets, telephone jacks and code alarm buttons and various other equipment. All equipment and electrical components can be readily accommodated by this flexible system with all of these electrical components mounted directly on snap-in panels which may be quickly changed because all of the wiring harnesses and terminals are pre-installed and all component snap-in panels are prewired with the components in place. All that must be done is to connect the prewired components of the snap-in panels to their associated wiring harnesses or terminals and to snap the panels in place and vice-versa for disconnecting and rapidly changing panels.

Accordingly, a rail system is provided which permits total flexibility in equipment location; provides multiple random access to both power and gases for medical type applications; makes new construction and renovation of critical care and patient rooms simple and cost efficient; and further the systems are easy to install and service.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. An electrical medical rail system for providing flexible, high and/or low voltage electrical service for medical applications comprising:

a hollow rail having means subdividing said rail into two or more longitudinal conduits which house the leads of an electrical supply, each of said longitudinal conduits housing the leads of a separate electrical supply, aligned outer grooves extending longitudinally along the top and bottom edges of said hollow rail for detachably mounting medical equipment and lighting in said outer grooves on said rail, at least one two component longitudinal housing having a first component in the form of a snap-in panel and a second component, said second component comprising an integral extrusion extending downwardly from said rail, said two component housing forming a high voltage housing having a high voltage supply positioned therein and fed from a cable positioned in said hollow rail, and high voltage electrical components are mounted on said snap-in panel and are adapted to be connected to said high voltage supply in said housing, said snap-in panel closing said two component housing.

2. The electrical medical rail system as claimed in claim 1 having a two piece low voltage housing comprising a housing element having a base and a snap-in panel frictionally engaging and closing said low voltage housing, said base of said low voltage housing resting on said rail and mounted contiguous to said rail.

3. The electrical medical apparatus as claimed in claim 1 wherein high voltage electrical components are fixedly mounted on said snap-in panel and detachably connectable to said high voltage supply in said housing whereby snap-in panels without electrical components and containing different components may be interchangeably mounted on said high voltage housing thereby providing flexibility in the configuration of said high voltage housing.

4. The electrical medical rail system claimed in claim 2 wherein said snap-in panel of said low voltage housing has low voltage electrical components mounted therein adapted to be detachably connected to a low voltage supply in said low voltage housing whereby low voltage snap-in panels containing different low voltage components may be interchangeably mounted on said low voltage housing.

5. An electrical medical rail system providing a flexible electrical service for medical applications comprising:

a hollow longitudinal rail having an integral downwardly and outwardly extending housing element and a spaced downwardly extending longitudinal ridge, said housing element and said downwardly extending ridge forming a housing member, a high voltage electrical cable housed in said hollow rail, electrical terminal block means mounted in said housing member and being connected to said high voltage electrical cable in said rail, aligned outer grooves extending longitudinally along the top and bottom edges of said hollow rail adapted to detachably mount medical equipment in said outer grooves, a snap-in panel in frictional engagement on said outwardly extending housing element and said downwardly extending longitudinal ridge on said hollow rail and closing said housing member.

6. The electrical medical rail system as claimed in claim 5 having a two piece low voltage housing comprising a low voltage housing component having a base and a snap-in panel engaging and closing said low voltage housing component, said base of said low voltage housing component resting on said hollow rail and mounted contiguous to said rail.

* * * * *